United States Patent Office 2,952,656
Patented Sept. 13, 1960

2,952,656

METHOD OF INCORPORATING CARBON BLACK IN A POLYMER OF ETHYLENE OR PROPYLENE

Jack Zomlefer, 13 Salisbury St., Leominster, Mass.

No Drawing. Filed July 16, 1957, Ser. No. 672,108

2 Claims. (Cl. 260—41)

This invention relates to compounds of finely divided pigments with solid polymers of ethylene, propylene and copolymers thereof and mixtures of such polymers. In particular, it relates to novel, homogeneously dispersed, unified, non-phasing compounds of finely divided carbon black with such polymers.

Carbon black has been used as an extender, filler, and reinforcer for many elastomers, plastics, and resins. Thus, finely divided carbon blacks form substantial proportions (25–50%) of most compounds based on natural or synthetic rubbers. In particular, carbon blacks of 100 millimicrons maximum particle size are especially useful.

The usual apparatus for dispersing finely divided carbon black in rubber or synthetic plastics and resins is a two-roll rubber mill or similar equipment, e.g. Banbury mill. Use of such equipment has yielded homogeneously dispersed, unified, nonphasing compounds of substantial quantities of carbon black with such bases as natural rubber, diene copolymer synthetic rubber, polychloroprene, and polymers and copolymers of vinyl chloride. Any such compound, on microscopic examination of sections, shows a single composition of firmly, thoroughly and uniformly dispersed carbon black in all the polymer with no separation of carbon black and polymer. It is generally believed that such compounds are physico-chemical reaction products rather than simple, intimate mixtures, as indeed is suggested by the typical increase in physical strength.

Attempts to prepare homogeneously dispersed, unified, non-phasing compounds of more than about 1% of carbon black with the polymers of this invention by similar methods have not been successful. Two-roll rubber mills and Banbury mills have been used to prepare intimate mixtures of finely-divided carbon black with polyethylene. However, compounds prepared in this manner have not been homogeneous dispersions but rather substantially mixtures of unblended, unstable phased particles of carbon black and polyethylene, unsuitable for molding or extrusion. The lack of adequate dispersion of carbon black has prevented the use of polyethylene and related polymers in such products as wire coating where the carbon black is desired for its lessening of cost, improvement in strength and electrical qualities, and for its stabilizing action against oxidation in light and air.

In accordance with the present invention a method is described for preparing homogeneously dispersed, stable, unified, non-phasing compounds of substantial quantities of finely divided carbon black with solid polymers, of ethylene, propylene, and ethylene-propylene copolymers, and mixtures and blends of such polymers and copolymers. Further, the compounds of this invention can be prepared as satisfactory molding or extrusion powders to yield strong, flexible products.

The method of this invention comprises essentially providing a constantly-agitated, thin solution of such polymers or polymer mixture at a temperature above its gel point, adding finely divided carbon black until dispersed while maintaining agitation and then removing the solvent. Preferably, the hot dispersion is cooled with constant agitation until a gel is formed before the solvent is removed. In all cases the resultant product is friable and easily broken into molding powder comprising a homogeneously dispersed, stable, unified, non-phasing compound.

The solvents usable in this invention are those which will completely dissolve the polymer at the temperature and concentration used. Examples of such solvents include liquid aromatic hydrocarbons (e.g. benzene, toluene, xylene), aromatic chlorinated hydrocarbons, aromatic ketones, aromatic aldehydes, aromatic nitro compounds, alkyl-aryl hydrocarbons, and chlorinated derivatives of alkyl-aryl hydrocarbons. With solid polymers of ethylene, it has been found that the process is more rapid and uniform when the concentration of the polyethylene in its solvent is no more than 25% by weight.

Any finely-divided carbon black can be homogeneously dispersed by the method of this invention. However, the strength of resultant molded products is especially high where the carbon black has a particle size no greater than 100 millimicrons. Further, with polyethylene the molding qualities of the compounds are superior where the carbon black content does not exceed 60% by weight of the polyethylene.

The polymer can be used alone or can be blended with small amounts of other compatible polymers and other ingredients, such as anti-oxidants and fillers to modify desired properties. In particular, it has been found that polyisobutylene in amounts up to 20% by weight on polyethylene gives exceptionally strong flexible, easy-molding compounds with carbon black.

The following examples in which all parts are by weight unless otherwise specified, more clearly illustrate specific embodiments of the subject invention.

*Example I*

400 parts of toluene were heated in a vessel to 100° C., a high-speed propeller agitator inserted and 40 parts of polyethylene (softening point about 90° C.) slowly added. When the polyethylene was completely dissolved, 20 parts of 50 millimicron particle size carbon black were slowly added, it being noted that the viscosity of the mixture appeared to decrease upon addition of the carbon black. After the black was added, the vessel was covered and the mixture was maintained with stirring at about 100° C. for one-half hour, and then allowed to cool while still stirring until a gel formed at about 45° C. The gel was then allowed to evaporate at room temperature, yielding a friable powder of homogeneously dispersed, stable, unified, non-phasing compound of polyethylene-carbon black. This powder exhibited good flow properties for molding and extrusion, and when molded yielded a product which was firm but a little brittle. In no case was there any separation of carbon black from the polyethylene.

*Example II*

400 parts of xylene were heated in a vessel to 100° C., a high-speed propeller agitator inserted and started, and 80 parts of polyethylene (softening point about 90° C.) slowly added. When the polyethylene was completely dissolved, 1.3 parts of dibutylparacresol, an antioxidant, were added and dissolved. While maintaining stirring 30 parts of 50 millimicron particle size carbon black were slowly added, with a similar drop in viscosity as in Example I. After the black was added, the vessel was maintained with stirring at about 100° C. for one-half hour, and then allowed to cool while still stirring until a gel formed at about 50° C. The gel was then allowed to evaporate at room temperature, yielding a friable powder of homogeneously dispersed, stable, unified, non-phasing compound of polyethylene-carbon black. This powder exhibited good flow properties for molding and extrusion, and molded, yielded a product as firm as Example I, but not noticeably brittle. As in Example I there was no separation of carbon black from the polyethylene.

*Example III*

Example I was repeated, except that 5 parts of polyisobutylene (e.g. Vistanex (Enjay Co.) B–120xc, B–80xc, or B–100xc) were dissolved in the toluene before addition of the polyethylene, and 50 grams of polyethylene and 15 grams of black were the amounts used. The powder formed exhibited good flow properties for molding and extrusion, and further, when molded yielded a flexible, much stronger, non-brittle, product than Example I.

The maximum uniformity and dispersion are achieved by the preferred step of maintaining agitation until the mixture cools to a gel. However, a high quality of dispersion can often be obtained by cooling without agitation if the cooling is sufficiently rapid.

As many apparently different embodiments of this invention may be made without departing from the spirit and scope thereof, it is to be understood that this invention is not limited to the specific embodiments thereof except as defined in the appended claims.

I claim:

1. A method for preparing a homogeneously dispersed, unified, stable, non-phasing moldable composition of finely-divided carbon black and a polymer selected from the group consisting of solid homopolymers of ethylene, solid homopolymers of propylene, solid copolymers of ethylene and propylene, and mixtures thereof, comprising providing a constantly agitated thin solution of no more than 25 percent by weight of the polymer in a solvent at a temperature above the gel point, maintaining stirring while adding 1 to 60 percent of carbon black by weight of the polymer until dispersed, cooling the mixture to its gel point while maintaining stirring and removing the solvent.

2. A method for preparing a homogeneously dispersed, unified, stable, non-phasing, moldable composition of solid polymer of ethylene and finely divided carbon black, comprising providing a constantly agitated thin solution of polymer in a solvent at a temperature above its gel point, the concentration of the polymer in the solvent being no more than 25 percent by weight, maintaining stirring while adding 1 to 60 percent of carbon black by weight of the polymer until dispersed, cooling the mixture to the gel point while maintaining stirring, and then removing the solvent.

References Cited in the file of this patent

UNITED STATES PATENTS

| | | |
|---|---|---|
| 2,200,429 | Perrin et al. | May 14, 1940 |
| 2,316,418 | Habgood | Apr. 13, 1943 |
| 2,339,958 | Sparks | Jan. 25, 1944 |
| 2,512,459 | Hamilton | June 20, 1950 |
| 2,554,461 | Howes et al. | May 22, 1951 |

FOREIGN PATENTS

| | | |
|---|---|---|
| 517,649 | Great Britain | Feb. 5, 1940 |
| 617,052 | Great Britain | Jan. 31, 1949 |